United States Patent Office 3,786,081
Patented Jan. 15, 1974

3,786,081
CRUDE OIL DEMULSIFIERS
Knut Oppenlaender, Ludwigshafen, Gert Liebold, Mannheim, and Egon Buettner, Ludwigshafen, Germany, assignors to Badische Anilin- & Soda-Fabrik Aktiengesellschaft, Ludwigshafen am Rhine, Germany
No Drawing. Filed Dec. 3, 1971, Ser. No. 204,723
Claims priority, application Germany, Dec. 4, 1970,
P 20 59 707.3
Int. Cl. C07c *125/06*
U.S. Cl. 260—471 C        2 Claims

ABSTRACT OF THE DISCLOSURE

Polyoxyalkylated derivatives of carbamic acids for use as quick-acting cold demulsifiers for water-in-oil emulsions.

---

Polyoxyalkylated compounds such as block copolymers of ethylene oxide and/or 1,2-propylene oxide are known, for example from U.S. Pat. 2,964,478. They are recommended for use as demulsifiers for oil-in-water emulsions containing predominantly water, but they are not suitable for use as demulsifiers for emulsions of inverse constituent proportions, that is, of water-in-oil emulsions containing predominantly oil. The segregation of the latter types of emulsion is, however, a particularly important problem in the mineral oil industry and a number of solutions thereto are known, but these solutions do not meet all requirements.

The previously known demulsifiers for water-in-oil emulsions, as disclosed for example in German published application DAS 1,545,250 and largely consisting of a variety of alkylene oxide polymers and compounds derived therefrom, all having hydrophilic end groups, are frequently too slow in action and usually act only at elevated temperatures. They leave unduly large concentrations of residual water or residual salt or residual emulsion or they give satisfactory results only with very special types of oil.

Usually, the tapped water-in-oil emulsions must be heated to temperatures above 40° C. and sometimes to as high as 80° C. depending on their viscosity, in order to achieve the desired low concentrations of water, salt and, in some cases, residual emulsion by a chemical process or combined chemical and electrical process. Such heating involves comparatively high energy consumption and it is thus desirable to find a way of breaking water-in-oil emulsions at the temperatures at which they are tapped, for example at from about 10° to 40° C., by adding suitable demulsifiers without applying heat.

It is an object of the invention to provide universally applicable demulsifiers for use industrially and which make it possible to break emulsions at ambient temperatures without heating or at least in a sufficiently short time.

This object is achieved by crude oil demulsifiers which contain compounds of Formula I:

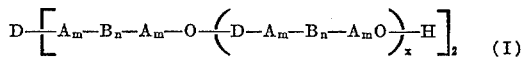

in which D denotes a bivalent radical derived from an aliphatic or aromatic, cycloaliphatic or aromatic-cycloaliphatic diisocyanate, A denotes the radical of the formula —OC$_2$H$_4$—, B denotes the radical of the formula —OC$_3$H$_6$—, $n$ and $m$ are the same or different and denote integers between 10 and 200 and $x$ is an integer from 0 to 5.

The structural unit A$_m$B$_n$A$_m$ in the above formula is a block copolymer prepared in known manner from 1,2-propylene oxide and ethylene oxide. $m$ and $n$ may be the same or different and denote integers between 10 and 200.

Preferably, $m$ and $n$ denote integers between 15 and 100.

The block A and B may have the same molecular weight but usually have different molecular weights, the molecular weight of block A conveniently having a value which is at least 0.6 times the value of the molecular weight of block B.

This block copolymer A$_m$B$_n$A$_m$ is reacted with diisocyanates. Suitable diisocyanates are aliphatic diisocyanates, aromatic-cycloaliphatic diisocyanates, aromatic diisocyanates, cycloaliphatic diisocyanates and, in particular, those diisocyanates whose aromatic and/or cycloaliphatic rings are bridged by methylene groups.

Examples of diisocyanates which are particularly suitable for reaction with the blocks A$_m$B$_n$A$_m$ are the following: toluylene diisocyanate, diphenylmethane diisocyanate, hexamethylene diisocyanate, phenylcyclohexylmethane diisocyanate and nonadecadiisocyanate of the formula:

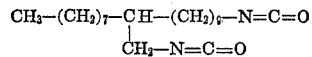

The preparation of the reaction products of the block copolymer polyalkylene glycol ethers with the diisocyanates may for example be carried out as follows: from 1 to 2 moles of the polyalkylene glycol ether are mixed with from 0.1 to 2 moles of one of the diisocyanates defined above. There are produced di- or poly-urethane depending on the molar ratio. For example, if 2 moles of a polyalkylene glycol ether of the structure A$_m$B$_n$A$_m$ are mixed with 1 mole of a diisocyanate and the two components are reacted with each other, the resulting diurethanes mainly have $x=0$. However, as the molar ratio approaches a ratio of 1:1 the corresponding polyurethanes are formed. In general, the polyurethanes formed have $x$ equal to or less than 5.

The reaction is catalyzed by bases. Suitable bases are those which do not react with the isocyanates to form by-products and which do not chemically attack the polyalkylene glycol ethers. We have found sterically hindered tertiary amines to be most suitable for this purpose.

Accordingly, examples of such amines which are useful for the process of the invention are tri-n-butylamine, tricyclohexylamine and triamylamine, the preferred amine being tri-n-butylamine due to its ready availability. Other tertiary amines, such as trimethylamine or triethylamine, are less suitable for the present reaction.

The course of the reaction is simple and the reaction is carried out, for example, by reacting from 0.1 to 2 parts of diisocyanate with from 1 to 2 parts of a polyalkylene glycol ether (the parts being molar parts), which glycol ether has the structure A$_m$B$_n$A$_m$ and contains from approximately 0.01 to 0.5% by weight of tri-n-butylamine, the reaction being continued until the isocyanate titer is approximately 0. The reaction is preferably carried out under nitrogen or some other gas which is inert to the reaction and at temperatures between 25° and 70° C. and preferably between 30° and 40° C. In order to keep the product in solution more easily, the reaction may be carried out in the presence of organic solvents boiling between 70° and 200° C. Preferred solvents are aromatic compounds such as benzene, toluene, xylenes, carbon tetrachloride, dioxane and also petroleum ethers which boil within the stated range and other organic solvents which are inert to the reaction.

The use of said solvents becomes essential when the molar ratio of the reactants is such that the said polyurethanes are formed. In general these polyurethanes are highly viscous and less soluble in water so that agitation thereof in the reaction vessel without said solvents would be very difficult or impossible.

For commercial uses, the solvent may remain in the product. However, this is not necessary in all cases.

The individual products are characterized by certain values such as saponification values, acid values and hydroxyl values etc. The products are usually viscous to pasty substances which are colorless to pale yellow according to molecular weight and the nature of the diisocyanate used.

The products may be used as such for breaking water-in-oil emulsions at ambient temperature, or, as already mentioned, they may be used in solution for this purpose. They are distinguished by an extremely rapid demulsifying action. It is preferred to use them in the form of solutions. Suitable solvents are, for example, the aforementioned solvents, particularly cycloaliphatic or aromatic hydrocarbons boiling in the approximately range 70° to 200° C., such as cyclohexanol, ethylcyclohexanol, toluene and xylene. The solutions are conveniently adjusted to a solids content of from 0.5 to 50% by weight. For the purpose of rapid demulsifying of water-in-oil emulsions in the cold the products of the invention are added either as such or in solution to the crude oil emulsions, preferably at the oil well. The demulsifying reaction takes place at the temperature of the freshly tapped water-in-oil emulsion at such a rate that the emulsion may break up on its way to the processing plant. Here it is readily separated into crude oil (dry oil) and salt water in an appropriate unheated separator in which an electric field may be used if cold demulsification is sluggish. In such difficult cases, a small portion of the salt water remains in the crude oil in the separators. This necessitates further treatment in chemical or combined chemical and electric plant (treaters) at elevated temperatures, but there is now the significant advantage that the major portion of the water has already been removed and thus no longer needs to be heated. Moreover, due to the rapid demulsifying action of the products, the oil treated in this way is fully separated within about 60–120 minutes. The fact that the water no longer needs to be heated in its initial amount in many cases is an invaluable advantage since the specific heat of water (1 cal. g.$^{-1}$ °C.$^{-1}$) is about twice as great as that of crude oil (0.5 cal. g.$^{-1}$ °C.$^{-1}$).

The products to be used in accordance with the present invention are valuable for separating salt water from crude oil from a wide variety of sources. These are added to the emulsions advantageously in proportions arranging from $10^{-4}$ to $10^{-2}$ and preferably from $5 \times 10^{-4}$ to $5 \times 10^{-3}$ percent by weight based on the weight of the emulsion to be separated, at temperatures ranging from 10° to 40° C.

The demulsifiers may be used for separating water-in-oil emulsions containing from about 0.1 to 90% by weight of salt water. Suitable oils which may be rapidly dehydrated at ambient temperature in this manner are those having pour points which are at least 10° C. below the temperature at which they are tapped. Examples are the oils tapped in Knesebeck, Rühlermoor, Hankensbüttel, Berkhöpen, Steimke, Stelle (Lower Saxony), Landau (Upper Rhine Valley), Arlesried (Alpine Foreland) Parentis, Mimizan (Southwest France) and Bahrein (Middle East), and numerous oils tapped in Caucasus and other parts of U.S.S.R.

Other suitable oils are those from South America and Mexico provided their pour point is more than 10° C. below the treating temperature.

The separation of the water-in-oil emulsions takes place without heating extremely rapidly and nearly quantitatively. If treaters have to be employed, demulsifying is complete within a few minutes or, in stubborn cases, in not more than from 1 to 2 hours.

Reaction products obtained from reaction mixtures which contain, as further reactant, polyoxyethylated isoalkylformaldehyde resins such as are described in French Pat. 1,566,470 show no technical advance over the bisurethanes and the polymers alone. The examples are followed by a comparative table which lists the advantages of the crude oil demulsifiers of the invention in clear comparison against those demulsifiers mentioned in said references.

EXAMPLE 1

General preparation 2 moles of a polyalkylene glycol ether having a molecular weight of from 2,000 to 8,000 are mixed with 0.25% by weight (based on polyalkylene glycol ether) of tri-n-butylamine under an atmosphere of nitrogen, and to the resulting mixture there are added dropwise from 0.1 to 2 moles of diisocyanate at from 30° to 40° C. The reaction is complete after stirring the mixture for 3 hours at the same temperature under a blanket of nitrogen. The end of the reaction is indicated by the isocyanate titer falling to zero. If the reaction is carried out at molar ratios leading to the formation of polyurethanes (ratio of polyalkylene glycol ether to diisocyanate form about 1.5:1 to 1:1), it is necessary to add organic solvents such as toluene.

The advantages of the crude oil demulsifiers are clearly shown in the following tables. Comparison is made with reaction mixtures which contain, as further reactant, isoalkylphenol/formaldehyde resins (in a molar ratio of 2:1:1, the latter figure indicating the proportion of resins), referred to as MP in the tables. Products containing phenolic resins not containing any diisocyanate, referred to as resin HP, are also listed for comparison. Further comparison is also made with pure $A_mB_nA_m$ block copolymers, simply indicated by a dash (—).

TABLE I
Cold demulsification of Hankensbuttel crude oil (50% H₂O) at 23° C. with 150 p.p.m. of demulsifier

| Ex. | M.W. of polypropylene glycol ether portion | n | M.W. of polyethylene glycol ether portion | m | Total M.W. of polyether portion I | OH value of I | Diisocyanate component II | Isoalkylphenol/formaldehyde polyoxyethylate III | Molar ratio of I:II or I:II:III | x | Water separation (ml.) after— | | | | Residual water content, percent |
|---|---|---|---|---|---|---|---|---|---|---|---|---|---|---|---|
| | | | | | | | | | | | 10 min. | 30 min. | 60 min. | 120 min. | |
| — | 2,300 | 40 | 1,200 | 14 | 3,500 | 43 | Toluylene | | 2:1 | 0 | 4 | 15 | 25 | 48 | 1.0 |
| MP | 2,300 | 40 | 1,200 | 14 | 3,500 | 43 | ...do... | (1) | 2:1:1 | ... | 3 | 10 | 17 | 35 | 15 |
| HP | | | | | | 133.5 | | (1) | | | 2 | 6 | 20 | 20 | Ca. 15 |
| — | 2,300 | 40 | 1,200 | 14 | 3,500 | 43 | | | | | 0 | Sp. | Sp. | 6 | |

TABLE II
Cold demulsification of Knesebeck crude oil (36% H₂O) at 26° C. using 150 p.p.m. of demulsifier

| Ex. | M.W. of polypropylene glycol ether portion | n | M.W. of polyethylene glycol ether portion | m | Total M.W. of polyether portion I | OH value of I | Diisocyanate component II | Isoalkylphenol/formaldehyde polyoxyethylate III | Molar ratio of I:II or I:II:III | x | Water separation (ml.) after— | | | | | Residual water content, percent |
|---|---|---|---|---|---|---|---|---|---|---|---|---|---|---|---|---|
| | | | | | | | | | | | 10 min. | 20 min. | 30 min. | 60 min. | 120 min. | |
| — | 2,300 | 40 | 1,200 | 14 | 3,500 | 43 | Toluylene | | 2:1 | 0 | 5 | 20 | 28 | 30 | 32 | 3.5 |
| MP | 2,300 | 40 | 1,200 | 14 | 3,500 | 43 | ...do... | (1) | 2:1:1 | ... | 4 | 18 | 25 | 27 | 28 | 8.0 |
| MP | 1,750 | 30 | 1,200 | 14 | 2,950 | 51 | ...do... | (1) | 2:1:1 | ... | 0 | Sp. | 1 | 3 | 5 | |
| MP | 1,750 | 30 | 7,000 | 80 | 8,750 | 16.8 | ...do... | (1) | 2:1:1 | ... | 0 | 0 | 0 | 1 | 1 | Ca. 30 |
| HP | | | | | | 133.5 | | (1) | | | 0 | 0 | 1 | 3 | 7 | |
| — | 2,300 | 40 | 1,200 | 14 | 3,500 | 43 | | | | | 0 | 0 | 1 | 2 | 5 | |
| 2.2 | 2,300 | 40 | 1,200 | 14 | 3,500 | 43 | Toluylene | | 1.3:1 | 2–3 | 5 | 18 | 25 | 30 | 32 | 3.8 |
| 2.3 | 2,300 | 40 | 1,200 | 14 | 3,500 | 43 | ...do... | | 1.5:1 | 1–2 | 5 | 20 | 26 | 30 | 31 | 4.0 |
| 2.4 | 2,300 | 40 | 1,200 | 14 | 3,500 | 43 | Nondeca | | 2:1 | 0 | 3 | 18 | 26 | 30 | 31 | 4.0 |
| 2.5 | 2,300 | 40 | 1,200 | 14 | 3,500 | 43 | Diphenylmethane | | 2:1 | 0 | 3 | 17 | 25 | 28 | 31 | 5.2 |

TABLE III
Rapid demulsification of Ruhlermoor crude oil (30% H₂O) at 60° C. using 100 p.p.m. of demulsifier

| Ex. | M.W. of polypropylene glycol ether portion | n | M.W. of polyethylene glycol ether portion | m | Total M.W. of polyether portion I | OH value of I | Diisocyanate component II | Isoalkylphenol/ formaldehyde polyoxyethylate III | Molar ratio of I:II or I:II:III | x | Water separation (ml.) after— 30 min. | 60 min. | 120 min. | 360 min. | Residual water/ residual emulsion, percent |
|---|---|---|---|---|---|---|---|---|---|---|---|---|---|---|---|
| 3.1 | 2,300 | 40 | 1,200 | 14 | 3,500 | 43 | Toluylene | | 1.5:1 | 1-2 | 22 | 25 | 27 | 28 | 4/5.6 |
| 3.2 | 2,300 | 40 | 1,200 | 14 | 3,500 | 43 | do | | 1.3:1 | 2-3 | 20 | 25 | 26 | 27 | 4/2.0 |
|  | 2,300 | 40 | 1,200 | 14 | 3,500 | 43 |  |  |  |  | 0 | 5 | 17 | 22 | 4.4/2.8 |
| HP |  |  |  |  |  | 133.5 |  | (1) |  |  | 0 | 3 | 12 | 20 | 4.0/8.5 |

TABLE IV
Rapid demulsification of Ruhlermoor crude oil (30% H₂O) at 60° C. using 30 p.p.m. of demulsifier

| Ex. | M.W. of polypropylene glycol ester portion | n | M.W. of polyethylene glycol ether portion | m | Total M.W. of polyether portion I | OH value of I | Diisocyanate component II | Isoalkylphenol/ formaldehyde polyoxyethylate III | Molar ratio of I:II or I:II:III | x | Water separation after 360 min. in ml. |
|---|---|---|---|---|---|---|---|---|---|---|---|
|  | 2,500 | 36 | 2,050 | 24 | 4,100 | 35 | Toluylene | | 2:1 | 0 | 22 |
|  | 2,250 | 39 | 2,250 | 26 | 4,500 | 34.2 | do | | 2:1 | 0 | 23 |
|  | 2,750 | 48 | 1,850 | 21 | 4,600 | 28.5 | do | | 2:1 | 0 | 26 |
|  | 3,250 | 56 | 2,150 | 25 | 5,800 | 26.5 | do | | 2:1 | 0 | 19 |
|  | 3,250 | 56 | 3,250 | 30 | 6,500 | 19.3 | do | | 2:1 | 0 | 23 |
|  | 2,300 | 40 | 1,200 | 14 | 3,500 | 43 | do | | 1.7:1 | 1-2 | 20 |
|  | 2,300 | 40 | 1,200 | 14 | 3,500 | 43 | do | | 1.2:1 | 3-4 | 18 |
|  | 2,300 | 40 | 1,200 | 14 | 3,500 | 43 | do | | 1.1:1 | 4-5 | 19 |
|  | 2,300 | 40 | 1,200 | 14 | 3,500 | 43 | do | | 1:1 | 5 | 19 |
| MP | 2,300 | 40 | 1,200 | 14 | 3,500 | 43 | do | (1) | 2:1:1 |  | 3 |
| MP | 1,750 | 30 | 1,200 | 14 | 2,950 | 51 | do | (1) | 2:1:1 |  | 1 |
|  | 2,300 | 40 | 1,200 | 14 | 3,500 | 43 | do | | 1.5:1 | 1-2 | 23 |
|  | 2,300 | 40 | 1,200 | 14 | 3,500 | 43 | do | | 1.3:1 | 2-3 | 29 |
|  | 1,750 | 30 | 1,200 | 14 | 2,950 | 51 | Hexa | | 2:1 | 0 | 24 |
|  | 1,500 | 25 | 1,000 | 12 | 2,600 | 55 | do | | 2:1 | 0 | 23 |
|  | 2,300 | 40 | 1,200 | 14 | 3,500 | 43 |  |  |  |  | 14 |
| MP | 1,750 | 30 | 7,000 | 80 | 8,750 | 16.8 | Toluylene | (1) | 2:1:1 |  | 3 |

We claim:
1. Compounds of the formula:

$$D-\left[A_m-B_n-A_m-O-\left(D-A_m-B_n-A_mO\right)_x-H\right]_2$$

in which D denotes a bivalent radical derived from toluylene diisocyanate, diphenymethane diisocyanate, hexamethylene diisocyanate, phenylcyclohexylmethane diisocyanate or nonadecadiisocyanate of the formula:

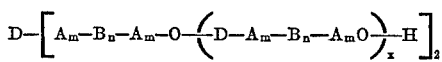

A denotes the radical of the formula $-OC_2H_4-$, B denotes the radical of the formula $-OC_3H_6-$, $n$ and $m$ are the same or different and denote integers between 10 and 200 and $x$ is an integer from 0 to 5.

2. Compounds as claimed in claim 1, wherein, in the formula, the molecular weight of the block A has a value which is at least 0.6 times the value of the molecular weight of block B.

References Cited
UNITED STATES PATENTS 2,695,913  11/1954  Bloch et al. _____ 260—471 C
3,365,412  1/1968  Thoma et al. _____ 260—471 C LORRAINE A. WEINBERGER, Primary Examiner L. A. THAXTON, Assistant Examiner U.S. Cl. X.R.

252—358; 260—77.5 AP, 468 E, 482 B